United States Patent
Toyama

(10) Patent No.: US 7,257,532 B2
(45) Date of Patent: Aug. 14, 2007

(54) APPARATUS AND METHOD FOR SPEECH RECOGNITION

(75) Inventor: Soichi Toyama, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 879 days.

(21) Appl. No.: 10/667,150

(22) Filed: Sep. 22, 2003

(65) Prior Publication Data
US 2004/0093210 A1 May 13, 2004

(30) Foreign Application Priority Data
Sep. 18, 2002 (JP) ............................. 2002-271670

(51) Int. Cl.
*G10L 15/00* (2006.01)
(52) U.S. Cl. ....................................... 704/243; 704/251
(58) Field of Classification Search ................. 704/243, 704/251
See application file for complete search history.

(56) References Cited

U.S. PATENT DOCUMENTS

| 5,956,679 | A | | 9/1999 | Komori et al. ............. 704/256 |
| 6,026,359 | A | * | 2/2000 | Yamaguchi et al. ...... 704/256.4 |
| 6,260,014 | B1 | * | 7/2001 | Bahl et al. .................. 704/254 |
| 6,389,393 | B1 | | 5/2002 | Gong ........................ 704/244 |
| 7,006,972 | B2 | * | 2/2006 | Hwang ...................... 704/244 |

FOREIGN PATENT DOCUMENTS

EP 0 779 609 A2 6/1997

OTHER PUBLICATIONS

A. Kannan et al., "Tree-Structured Models Of Parameter Dependence For Rapid Adaptation In Large Vocabulary Conversational Speech Recognition", 1999 IEEE, pp. 769-772.
M. Kemal Sonmez, "Information Geometry Of Topology Preserving Adaptation", 2000 IEEE, pp. 3743-3746.
"Improved Robustness for Speech Recognition Under Noisy Conditions Using Correlated Parallel Model Combination", J. Hung et al., Institute of Information Science, 1998 IEEE, pp. 553-556.

* cited by examiner

Primary Examiner—Daniel Abebe
(74) Attorney, Agent, or Firm—Arent Fox LLP

(57) ABSTRACT

Before executing a speech recognition, a composite acoustic model adapted to noise is generated by composition of a noise adaptive representative acoustic model generated by noise-adaptation of each representative acoustic model and difference models stored in advance in a storing section, respectively. Then, the noise and speaker adaptive acoustic model is generated by executing speaker-adaptation to the composite acoustic model with the feature vector series of uttered speech. The renewal difference model is generated by the difference between the noise and speaker adaptive acoustic model and the noise adaptive representative acoustic model, to replace the difference model stored in the storing section therewith. The speech recognition is performed by comparing the feature vector series of the uttered speech to be recognized with the composite acoustic model adapted to noise and speaker generated by the composition of the noise adaptive representative acoustic model and the renewal difference model.

6 Claims, 9 Drawing Sheets

APPARATUS AND METHOD FOR SPEECH RECOGNITION

BACKGROUND OF THE INVENTION

The present invention relates to a speech recognition apparatus and a speech recognition method for an adaptation to both noise and speaker.

The main problems in automatic speech recognition exits in a background noise added to the speech to be recognized, and individual variation caused by phonetic organs or utterance habits of an individual speaker.

In order to achieve a robust speech recognition capable of coping with these problems, the speech recognition methods called an HMM (Hidden Markov Model) composition or also called a PMC (Parallel Model Combination) method have been studied (for example, see pages 553-556 of IEEE ICASSP 1998 "Improved Robustness for Speech Recognition Under Noisy Conditions Using Correlated Parallel Model Combination").

At the pre-processing stage before performing a real speech recognition, the HMM composition method or the PMC method generates noise adaptive acoustic models (noise adaptive acoustic HMMs) as noise adaptive composite acoustic models by the composition of standard initial acoustic models (initial acoustic HMMs) and noise models (speaker's environmental noise HMM) generated from the background noise.

In real speech recognition stages, each likelihood of noise adaptive acoustic models having been generated in a pre-processing is compared with feature vector series, which are obtained from a cepstrum transformation of the uttered speech including the additive background noise, to output the noise adaptive acoustic model with the maximum likelihood as a result of speech recognition.

Technologies for speaker adaptation have been also studied diversely, and for example, a MAP estimation method or a MLLR method for renewing the mean vector and the covariance matrix of a model are known.

A conventional speech recognition, however, has a problem of requiring a large amount of processing for performing noise-adaptation of all initial acoustic models in order to obtain noise adaptive acoustic models (noise adaptive acoustic HMMs) to be compared with the feature vector series.

The required large amount of processing, which can not be accepted to keep high processing speed, hinders increasing the number of initial acoustic models. Thus, the lack of initial acoustic models obstructs the improvement of a recognition performance. It should be noted that it is possible to improve the efficiency of an environmental noise adaptation technology by using a clustering technique. However, it is hard to directly adapt well-known speaker adaptation technologies such as the MLLR method or the MAP estimation method to this environmental noise adaptation technology, that is, the coexistence of both noise and speaker adaptation technologies have been a subject to be solved.

SUMMARY OF THE INVENTION

The present invention has been achieved in view of the foregoing conventional problems. It is thus an object of the present invention to provide speech recognition apparatus and methods capable of reducing an amount of processing, which is required for the noise and speaker adaptation of initial acoustic models.

According to a first aspect of the present invention, there is provided a speech recognition apparatus for recognizing speech by comparing composite acoustic models adapted to noise and speaker with a feature vector series extracted from an uttered speech. The speech recognition apparatus comprises a storing section for previously storing each representative acoustic model selected as a representative of acoustic models belonging to one of groups, each of the groups being formed beforehand by classifying a large number of acoustic models on a basis of a similarity, difference models of each group obtained from difference between the acoustic models belonging to one of the groups and the representative acoustic model of the identical group, and group information for corresponding the representative acoustic models with the difference models every the identical group. The speech recognition apparatus further comprises a generating section for generating each noise adaptive representative acoustic model of the each group by noise-adaptation executed to the representative acoustic model of the each group stored in the storing section, and a generating section for generating each composite acoustic model of the each group by composition of the difference model and the noise adaptive representative acoustic model using the group information. Additionally, the speech recognition apparatus comprises a renewal model generating section for generating noise and speaker adaptive acoustic models by performing a speaker-adaptation of the composite acoustic model every identical group, using the feature vector series obtained from the uttered speech, and a model renewal section for replacing the difference models of the each group by renewal difference models which are generated by taking differences between the noise and speaker adaptive acoustic models and the noise adaptive representative acoustic models selected via the group information, thereby performing a speech recognition by comparing the feature vector series extracted from the uttered speech to be recognized with the composite acoustic model adapted to noise and speaker. Moreover, the composite acoustic model adapted to noise and speaker is generated by composition of the renewal difference model and the noise adaptive representative acoustic model, which is generated by a noise-adaptation of the representative acoustic model of the group including the renewal difference model selected via the group information.

According to a second aspect of the present invention, there is provided a speech recognition apparatus for recognizing speech by comparing composite acoustic models adapted to noise and speaker with a feature vector series extracted from an uttered speech. The speech recognition apparatus comprises a storing section for previously storing each representative acoustic model selected as a representative of acoustic models belonging to one of groups, each of the groups being formed beforehand by classifying a large number of acoustic models on a basis of a similarity, difference models of each group obtained from difference between the acoustic models belonging to one of the groups and the representative acoustic model of the identical group, and group information for corresponding the representative acoustic models with the difference models every the identical group. The speech recognition apparatus further comprises a generating section for generating each noise adaptive representative acoustic model of the each group by noise-adaptation executed to the representative acoustic model of the each group stored in the storing section, and a generating section for generating each composite acoustic model of the each group by composition of the difference model and the noise adaptive representative acoustic model using the group information. Additionally, the speech recognition apparatus comprises a recognition processing section for recognizing speech by comparing the composite acoustic models generated in the generating section for composite acoustic models with the feature vector series extracted from the uttered speech to be recognized, a renewal model generating section for generating noise and speaker adaptive acoustic models by performing a speaker-adaptation of the composite acoustic model every identical group, using the feature vector series obtained from the uttered speech, and a model renewal section for replacing the difference models of the each group by renewal difference models which are generated by taking differences between the noise and speaker adaptive acoustic models and the noise adaptive representative acoustic models selected via the group information, thereby the recognition processing section performs a speech recognition by comparing the feature vector series extracted from the uttered speech to be recognized with the composite acoustic model adapted to noise and speaker generated by composition of the noise adaptive representative acoustic model generated by noise-adaptation of the representative acoustic model of each group including the renewal difference model selected with the group information and the renewal difference model renewed by the renewal model generating section and the model renewal section, every repetition of the speech recognition.

According to a third aspect of the present invention, there is provided a speech recognition method for recognizing speech by comparing a set of composite acoustic models adapted to noise and speaker with a feature vector series extracted from an uttered speech. The speech recognition method comprises the step of previously storing, in a storing section, each representative acoustic model selected as a representative of acoustic models belonging to one of groups, each of the groups being formed beforehand by classing a large number of acoustic models on a basis of a similarity, difference models of each group obtained from difference between the acoustic models belonging to one of the groups and the representative acoustic model of the identical group, and group information for corresponding the representative acoustic models with the difference models every the identical group. Further, the speech recognition method comprises the steps of generating each noise adaptive representative acoustic model of the each group by noise-adaptation executed to the representative acoustic model of the each group stored in the storing section, and generating each composite acoustic model of the each group by composition of the difference model and the noise adaptive representative acoustic model using the group information. Additionally, the speech recognition method comprises the steps of generating noise and speaker adaptive acoustic models by performing a speaker-adaptation of the composite acoustic model every identical group, using the feature vector series obtained from the uttered speech, and replacing the stored difference models of the each group by renewal difference models which are generated by taking differences between the noise and speaker adaptive acoustic models and the noise adaptive representative acoustic models selected via the group information. Under the above-mentioned steps, the speech recognition is performed by comparing the feature vector series extracted from the uttered speech to be recognized with the composite acoustic model adapted to noise and speaker. Moreover, the composite acoustic model adapted to noise and speaker is generated by composition of the renewal difference model and the noise adaptive representative acoustic model, which is generated by a noise-adaptation of the representative acoustic model of the group including the renewal difference model selected via the group information.

According to a fourth aspect of the present invention, there is provided a speech recognition method for recognizing speech by comparing a set of composite acoustic models adapted to noise and speaker with feature vector series extracted from an uttered speech. The speech recognition method comprises the step of previously storing, in a storing section, each representative acoustic model selected as a representative of acoustic models belonging to one of groups, each of the groups being formed beforehand by classing a large number of acoustic models on a basis of a similarity, difference models of each group obtained from difference between the acoustic models belonging to one of the groups and the representative acoustic model of the identical group, and group information for corresponding the representative acoustic models with the difference models every the identical group. Further, the speech recognition method comprises the steps of generating each noise adaptive representative acoustic model of the each group by noise-adaptation executed to the representative acoustic model of the each group stored in the storing section, and generating each composite acoustic model of the each group by composition of the difference model and the noise adaptive representative acoustic model using the group information. Additionally, the speech recognition method comprises the steps of recognizing a speech by comparing the composite acoustic models generated in the generating step for composite acoustic models with the feature vector series extracted from the uttered speech to be recognized, generating noise and speaker adaptive acoustic models by performing a speaker-adaptation of the composite acoustic model every identical group, using the feature vector series obtained from the uttered speech, and replacing the stored difference models of the each group by renewal difference models which are generated by taking differences between the noise and speaker adaptive acoustic models and the noise adaptive representative acoustic models selected via the group information. Under the above-mentioned steps, the recognition processing step performs a speech recognition by comparing the feature vector series extracted from the uttered speech to be recognized with the composite acoustic model adapted to noise and speaker generated by composition of the noise adaptive representative acoustic model generated by noise-adaptation of the representative acoustic model of each group including the renewal difference model selected with the group information and the renewal difference model renewed by the noise and speaker adaptive acoustic models generating step and the difference models replacing step, every repetition of the speech recognition.

BRIEF DESCRIPTION OF THE DRAWINGS

These and other objects and advantages of the present invention will become understood clearly from the following description with reference to the accompanying drawings, wherein.

DETAILED DESCRIPTION OF THE PREFERRED EMBODIMENTS

The preferred embodiments of the present invention will be explained referring to the attached drawings.

First Embodiment

Figure 1:
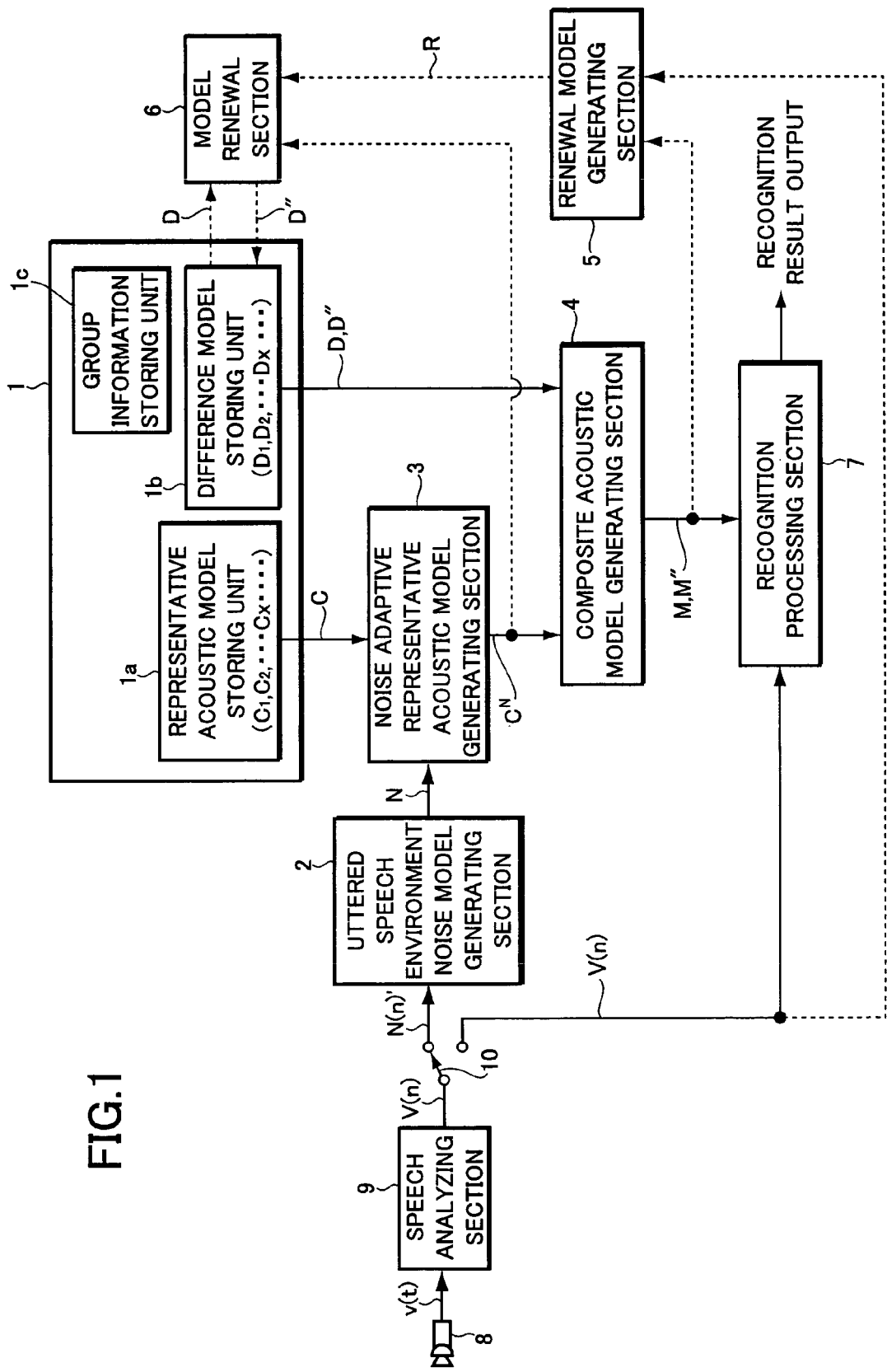
FIG. 1 is a block diagram for illustrating a structure of speech recognition apparatus according to the first embodiment of the present invention.

The first embodiment of the present invention will be explained referring to FIG. 1 through FIG. 7. FIG. 1 is a block diagram showing a structure of a speech recognition apparatus of the present embodiment.

As shown in FIG. 1, the speech recognition apparatus has a structure for recognizing speech using HMM, and comprises a storing section 1 which previously stores data of acoustic model or the like, an uttered speech environment noise model generating section 2, a noise adaptive representative acoustic model generating section 3, a composite acoustic model generating section 4, a renewal model generating section 5, a model renewal section 6, and a recognition processing section 7.

Furthermore, the speech recognition apparatus employs a switch 10 and a speech analyzing section 9 which generates and outputs the feature vector series V(n) in the cepstrum domain every predetermined frame period using a cepstrum transformation of an input signal v(t) from a microphone 8.

The storing section 1 stores beforehand many acoustic models of sub-word unit such as phoneme generated by learning a standard uttered speech.

Note that a large number of initial acoustic models (obtained only by learning a standard uttered speech) are not stored in the primitive form, but representative acoustic models (C) and difference models (D) obtained by grouping or clustering each distribution (with mean vector and covariance matrix) of the large number of initial acoustic models are stored in a representative acoustic model storing unit $1a$ and a difference model storing unit $1b$ respectively. More detailed descriptions will be given below.

The large number of initial acoustic models are divided into groups $G_1 \sim G_X$ by the clustering method as mentioned above. Then, assuming that, for example, the first (x=1) group $G_1$ has $q_1$ pieces of initial acoustic models $S_{1,1} \sim S_{1,q1}$ as its members, one representative acoustic model $C_1$ and $q_1$ pieces of difference models $d_{1,1} \sim d_{1,q1}$ are led therefrom.

When the second (x=2) group $G_2$ has $q_2$ pieces of initial acoustic models $S_{2,1} \sim S_{2,q1}$ as its members, one representative acoustic model $C_2$ and $q_2$ pieces of difference models $d_{2,1} \sim d_{2,q1}$ are led therefrom. In the same manner, when the last (x=X) group $G_X$ has $q_X$ pieces of initial acoustic models $S_{X,1} \sim S_{X,q1}$ one representative acoustic model $C_X$ and $q_X$ pieces of difference models $d_{X,1} \sim d_{X,q1}$ are led therefrom.

As shown in FIG. 1, each representative acoustic model $C_1 \sim C_X$ belonging to each group $G_1 \sim G_X$ is stored in the representative acoustic model storing unit $1a$ through grouping them, and each difference model such as $d_{1,1} \sim d_{1,q1}$, $d_{2,1} \sim d_{2,q2}$ and $d_{X,1} \sim d_{X,qX}$ corresponding to each representative acoustic model is stored in the difference model storing unit $1b$ under each group.

Moreover, in FIG. 1, $q_1$ pieces of difference models $d_{1,1} \sim d_{1,q1}$ corresponding to the representative acoustic model $C_1$ of group $G_1$ are denoted by a code $D_1$, and $q_2$ pieces of difference models $d_{2,1} \sim d_{2,q2}$ corresponding to the representative acoustic model $C_2$ of group $G_2$ are denoted by a code $D_2$. In the same manner, $q_X$ pieces of difference models $d_{X,1} \sim d_{X,qX}$ corresponding to the representative acoustic model $C_X$ of group $G_X$ are denoted by a code $D_X$.

Furthermore, group information for managing the corresponding relationship between the representative acoustic models $C_1 \sim C_X$ and the difference models $D_1 \sim D_X$ is stored in a group information storing unit $1c$.

Figure 2:
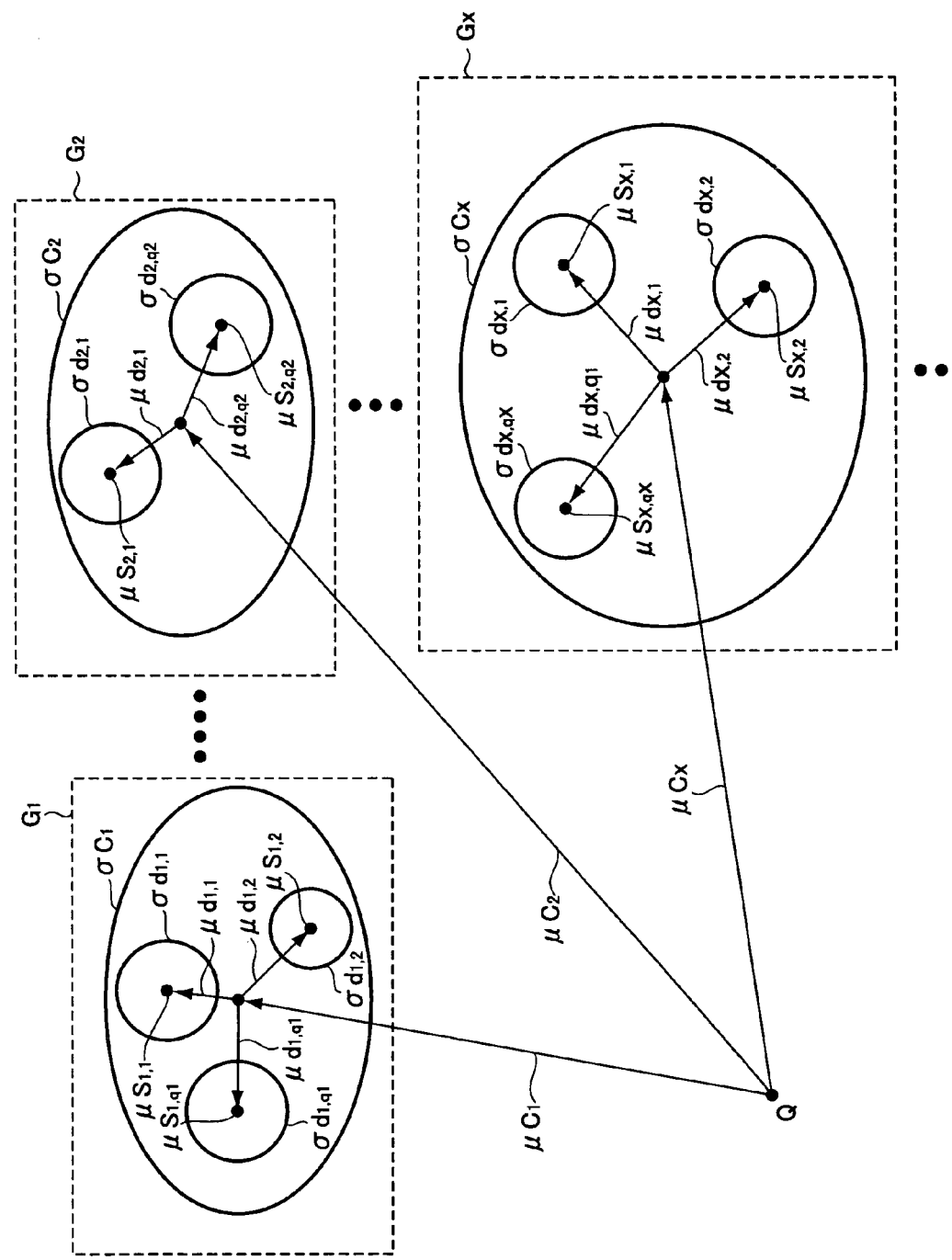
FIG. 2 is an explanatory view for illustrating a generation principle of representative acoustic models and difference models.

FIG. 2 is a schematic diagram for illustrating a generation principle of each representative acoustic model $C_1 \sim C_X$ corresponding to each group $G_1 \sim G_X$ and each difference model $D_1 \sim D_X$ corresponding to each representative acoustic model $C_1 \sim C_X$. The generation principle will be explained below referring to FIG. 2.

Firstly, the grouping or clustering of a large number of initial acoustic models (initial acoustic HMMs) with a distribution S generates each group containing initial acoustic models similar to each other, and further the above-mentioned group information is also provided.

Clustering methods such as LBG Method or Split Method can be used as a grouping method. The clustering is performed based on the similarity of the mean vectors of each distribution of initial acoustic models.

The grouping may be performed by using advance information such as the similarity of phoneme corresponding to each model. For example, vowel model and consonant model may form two groups.

The grouping of initial acoustic models may be performed by using the former and latter methods together. These clustering enable the grouping as shown in FIG. 2 schematically.

For example, in the case of an acoustic model belonging to the xth group $G_X$, the first acoustic model denoted by $S_{X,1}$ is a distribution having its mean vector $\mu S_{X,1}$ and its covariance matrix $\sigma d_{X,1}$ ($=\sigma S_{X,1}$), and also the second acoustic model denoted by $S_{X,2}$ is a distribution having its mean vector $\mu S_{X,2}$ and its covariance matrix $\sigma d_{X,2}$ ($=\sigma S_{X,2}$). In the same manner, the $q_X$th acoustic model denoted by $S_{X,qx}$ is a distribution having its mean vector $\mu S_{X,qx}$ and its covariance matrix $\sigma d_{X,qx}$ ($=\sigma S_{X,qx}$).

An acoustic model belonging to the other groups such as $G_1$, $G_2$ etc. is also a distribution having a mean vector and a covariance matrix.

A method for obtaining each representative acoustic model $C_1 \sim C_X$ of each group $G_1 \sim G_X$ will be explained. A case of obtaining a representative acoustic model $C_X$ of the Xth group $G_X$ will be explained below for convenience of explanation.

As shown in FIG. 2, a representative acoustic model $C_X$ is a distribution having a mean vector $\mu C_X$ originating from the base point Q and a distribution of covariance matrix $\sigma C_X$ (indicated by an ellipse in FIG. 2) corresponding to the mean vector $\mu C_X$.

Assuming that a representative acoustic model $C_X$ is denoted by $C_X$ ($\mu C_X$, $\sigma C_X$), the mean vector $\mu C_X$ can be obtained as follow;

$$\mu C_X = (1/qX) \cdot \sum_{y=1}^{qx} \mu S_{X,y}. \tag{1}$$

The covariance matrix $\sigma C_X$ can be also obtained as follow;

$$\sigma S_X = (1/qX) \cdot \sum_{y=1}^{qx} \sigma_{X,y} + (1/qX) \cdot \sum_{y=1}^{qx} (\mu_{X,y} - \mu C_X) \cdot (\mu_{X,y} - \mu C_X)^T. \tag{2}$$

In the above expressions (1), (2), the variable X denotes the Xth group $G_X$, the variable y denotes each acoustic model $S_{X,y}$ ($1 \leq y \leq q_X$) belonging to group $G_X$, and the variable $q_X$ denotes the total number of acoustic models $S_{X,y}$ belonging to group $G_X$.

Representative acoustic models of the other groups $G_1$, $G_2$ etc. can be also obtained from the above expressions (1) and (2).

Next, each difference model $D_1 \sim D_X$ corresponding to each group $G_1 \sim G_X$ can be calculated by the next expression (3).

How to obtain the difference model $D_X$ (that is, $d_{X,1}$, $d_{X,2} \sim d_{X,qX}$) corresponding to the Xth group $G_X$ shown in FIG. 2 will be explained for convenience.

The mean vector $\mu d_{X,y}$ can be obtained from $$\mu d_{X,y} = \mu S_{X,y} - \mu C_X. \tag{3}$$

The covariance matrix $\sigma d_{X,Y}$ can be determined by $$\sigma d_{X,y} = \sigma S_{X,y}. \tag{4}$$

In the above expressions (3) and (4), the variable X denotes the Xth group $G_X$, the variable y denotes each acoustic model $S_{X,y}$ ($1 \leq y \leq q_X$) belonging to group $G_X$, and the variable $q_X$ denotes the total number of acoustic models $S_{X,y}$ belonging to group $G_X$.

The mean vector $\mu d_{X,y}$ and the covariance matrix $\sigma d_{X,Y}$ determined by the above expressions (3) and (4) compose the difference model $d_{X,y}$.

More specifically, the difference model $d_{X,1}$ is the distribution with the mean vector $\mu d_{X,1}$ and the covariance matrix $\sigma d_{X,1}$, and the difference model $d_{X,2}$ is the distribution with the mean vector $\mu d_{X,2}$ and the covariance matrix $\sigma d_{X,2}$. In the same manner, the difference model $d_{X,y}$ ($y=q_X$) is the distribution with the mean vector $\mu d_{X,y}$ and the covariance matrix $\sigma d_{X,y}$, and thus the total number $q_X$ of the difference models $d_{X,1} \sim d_{X,y}$ can be determined.

The representative acoustic model $C_1 \sim C_X$ and the difference model $D_1$ ($d_{1,1} \sim d_{1,q1}$)$\sim D_X$ ($d_{X,1} \sim d_{X,qX}$) are stored beforehand with correspondence to each group in the representative acoustic model storing unit $1a$ and the difference model storing unit $1b$, respectively.

Figure 3:
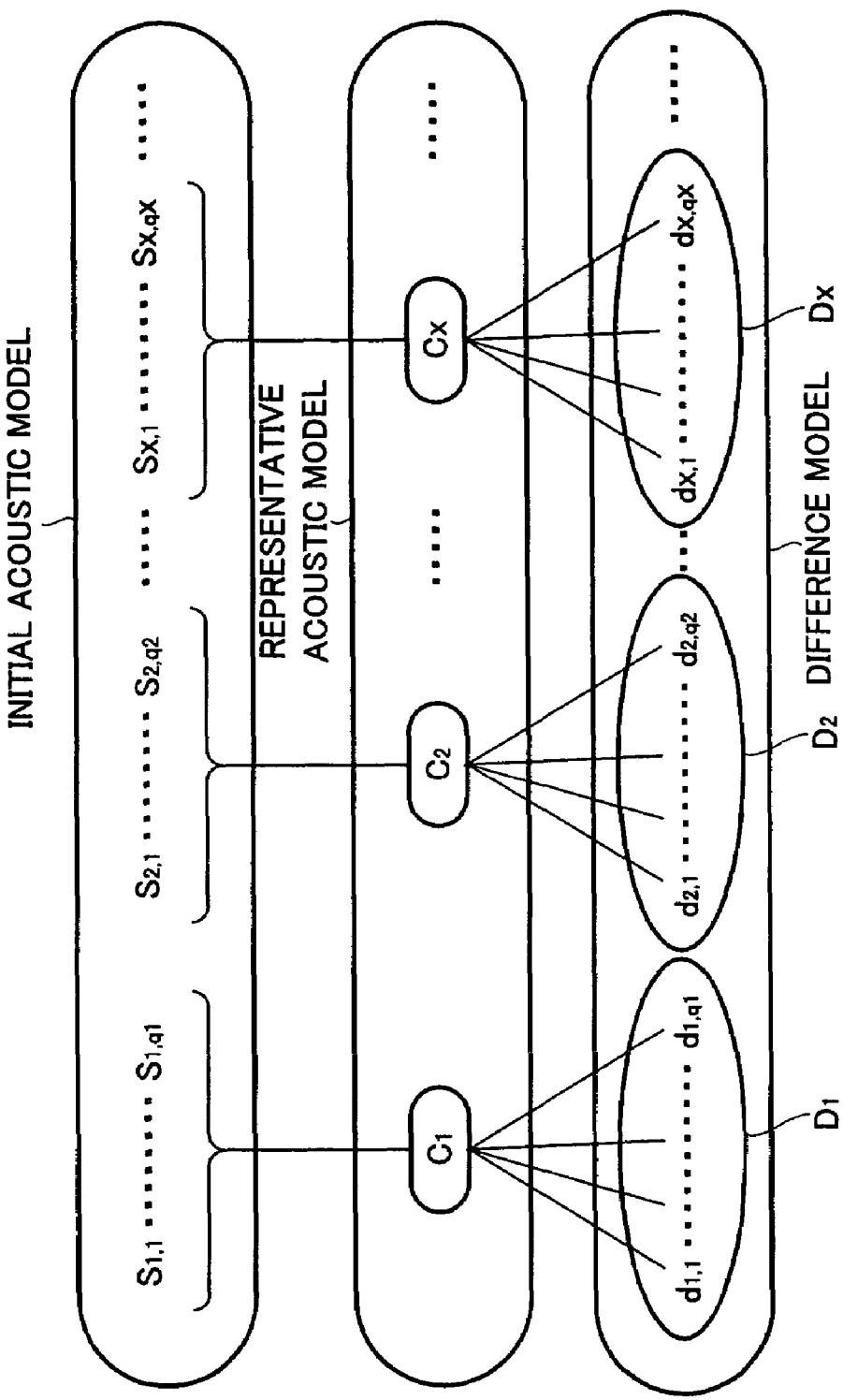
FIG. 3 is an explanatory view for illustrating a relationship among representative acoustic models, difference models and initial acoustic models.

As shown schematically in FIG. 3, in more general expression, the initial acoustic model $S_{X,y}$ corresponding to the difference model $d_{X,y}$ can be determined by composition of the yth difference model $d_{X,y}$ belonging to the Xth group $G_X$ and the representative acoustic model $C_X$ belonging to the identical group as that of the difference model $d_{X,y}$. On the basis of this relation, the representative acoustic model $C_X$ ($1 \leq x \leq X$) and the difference model $D_X$ ($1 \leq x \leq X$) corresponding to each group $G_X$ ($1 \leq x \leq X$) are stored in the storing units $1a$ and $1b$ respectively, and are managed with correspondence to each group based on the stored group information.

In the present embodiment, the processing of the above-mentioned composition is realized by the following expression (5), (6);

$$\mu d_{X,y} + \mu C_X = \mu S_{X,y}, \tag{5}$$

$$\sigma d_{X,y} = \sigma S_{X,y}. \tag{6}$$

That is, the mean vector is obtained by addition, and the covariance matrix is obtained only by replacement.

For convenience of explanation, each distribution $S_{X,y}$ of initial acoustic models is identified by numbering of the yth distribution of a group $G_X$. However, in reality, the distribution of an initial acoustic model is corresponded to a HMM, and each distribution of the difference model is also corresponded to each HMM to be stored.

Group information B, which includes the relationship between each distribution of the initial acoustic model corresponding to each HMM and the group to which the distribution belongs, is stored in a group information storing unit $1c$.

For example, the distribution of the initial acoustic model corresponding to the HMM number i, the state number j and the mixture number k is denoted by $S^m_{i,j,k}$, and each difference model corresponding to the above distribution is denoted by $d^m_{i,j,k}$. Furthermore, the cluster to which the distribution of the initial acoustic model $S^m_{i,j,k}$ and each difference model $d^m_{i,j,k}$ belong is denoted by $\beta$, then the group information $B^m_{i,j,k}$ indicating the group to which the distribution $S^m_{i,j,k}$ belongs is denoted by $$B^m_{i,j,k} = \beta. \tag{7}$$

Thus, the corresponding relationship among the initial acoustic models, the difference models, and the group to which these models belong, can be obtained by the cluster information $B^m$.

A noise adaptive representative acoustic model generating section 3 employs Jacobian adaptation method as a noise adaptive method. The representative acoustic model C of each group is renewed and stored by an initial composite acoustic model, which is composed of the initial noise model (denoted by $N_S$) formed beforehand and the representative acoustic model of each group, using the HMM composition.

The Jacobian matrix J of each group, which is determined from the initial noise model $N_S$ and the renewed representative acoustic model C, and the initial noise model $N_S$ are stored, respectively, and supplied to the noise adaptive representative acoustic model generating section 3.

An uttered speech environment noise model generating section 2 generates uttered speech environment noise models (uttered speech environment noise HMMs) N based on the background noise of speech environment during non-uttered speech period.

During the non-uttered period when a speaker does not yet utter, the background noise at speech environment is collected through a microphone 8. The speech analyzing section 9 generates feature vector series V(n) of background noise of every predetermined frame period from the collected signal V(t). The feature vector series V(n) are applied to the uttered speech environment noise generating section 2 as the feature vector series N(n)' of background noise by switching the switch 10. Then, the uttered speech environment noise model generating section 2 generates the uttered speech environment noise model N by learning the feature vector series N(n)'.

The noise adaptive representative acoustic model generating section 3 generates noise adaptive representative acoustic models (noise adaptive representative acoustic HMMs) $C_1^N \sim C_X^N$ corresponding to each group $G_1 \sim G_X$, using noise-adaptation of representative acoustic models $C_1 \sim C_X$ to uttered speech environment noise models N, and then feeds them to the composite acoustic model generating section 4.

The method of noise-adaptation employs so-called noise-adaptation method for the superposition of the uttered speech environment noise model upon the distribution of representative acoustic model, using HMM composition, Jacobian adaptation method or the like.

The HMM composition calculates the noise adaptive representative acoustic model $C_X^N$ of each group using uttered speech environment noise models N and the representative acoustic model $C_X$ of each group.

Jacobian adaptation method calculates the noise adaptive representative acoustic model $C_X^N$ using the representative acoustic model $C_X$ of each group, which is renewed by the initial composite model, the initial noise $N_S$, the uttered speech environment noise model N and the Jacobian matrix J of each group.

The noise-adaptation of the representative acoustic model $C_X$ of each group $G_X$ will be described hereinafter more generally. When the background noise is assumed to be stationary and the noise model N to be a model with 1 state and 1 mixture number, a representative acoustic model $C_X$ is adapted to noise to become the noise adaptive representative acoustic model $C_X^N$, by using noise-adaptation processing such as the HMM composition scheme or the Jacobian adaptation method. The mean vector and covariance matrix of the representative are transformed to $\mu C_X^N$ and $\sigma C_X^N$ respectively.

When the noise model N is to be a model with at least 2 state and at least 2 mixture number, the representative acoustic model $C_X$ corresponds to at least two noise adaptive distributions, that is, the representative acoustic model $C_X$ corresponds to $C_{X,1}^N$, $C_{X,2}^N$ . . . .

The composite acoustic model generating section 4 generates a plurality of composite acoustic models (composite acoustic HMMs) M by the composition of each difference model stored (denoted by D in FIG. 1) in the difference model storing unit 1b and each noise adaptive representative acoustic model (denoted by $C^N$ in FIG. 1) with regard to each group $G_1 \sim G_X$.

More generally described, the noise adaptive representative acoustic model generating section 3 generates noise adaptive representative acoustic models $C_X^N$ ($1 \leq x \leq X$) corresponding to each group $G_X$ ($1 \leq x \leq X$), then, the composite acoustic model generating section 4 generates $q_X$ pieces of composite acoustic models $M_{X,1} \sim M_{X,y}$, which are equivalent to noise-adaptation of initial acoustic models $S_{X,1} \sim S_{X,y}$, by the composition of each difference model $d_{X,1} \sim d_{X,y}$ ($y=q_X$) and each noise adaptive representative acoustic model $C_X^N$ ($1 \leq x \leq X$).

Figure 4:
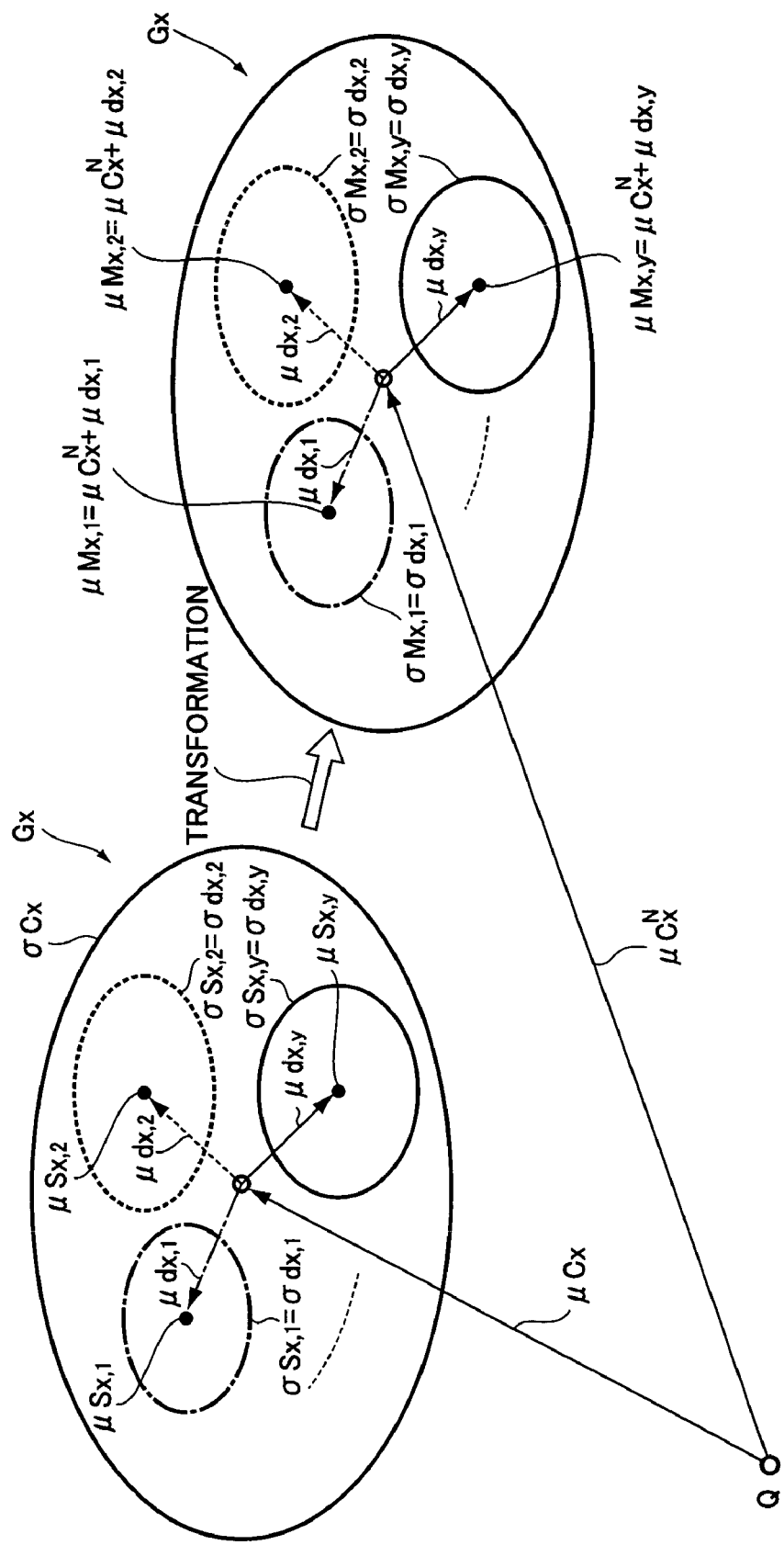
FIG. 4 is an explanatory view for illustrating a generation principle of noise adaptive composite acoustic models.

FIG. 4 is a schematic drawing illustrating the structure of a set of composite acoustic models M generated as described above. As a representative example, the structure of composite acoustic models $M_{1,1} \sim M_{1,y}$ generated from the representative acoustic model $C_X$ and difference models $d_{1,1} \sim d_{1,y}$ ($y=q_X$) belonging to the group Gx are shown.

In FIG. 4, the above-mentioned composition is illustrated without the effect of the covariance matrix, for easy understanding.

The mean vector and the covariance of a set of composite acoustic models $M_{X,y}$ are denoted by $\mu M_{X,y}$ and $\sigma M_{X,y}$, respectively. In the case of the composition of the noise adaptive representative acoustic model and the difference model, when the change in the variance of representative acoustic models caused by noise-adaptation is not taken into consideration, the mean vector $\mu M_{X,y}$ and the covariance matrix $\sigma M_{X,y}$ of the set of composite acoustic models $M_{X,y}$ are calculated by the following expressions;

$$\mu M_{X,y} = \mu d_{X,y} + \mu C_X^N, \tag{8}$$

$$\sigma M_{X,y} = \sigma d_{X,y}. \tag{9}$$

On the other hand, when the change in the variance of representative acoustic models caused by the noise-adaptation is taken into consideration, the mean vector $\mu M_{X,y}$ and the covariance matrix $\sigma M_{X,y}$ are calculated by the following expressions;

$$\mu M_{X,y} = \mu d_{X,y} + \sigma C_X^N (1/2) \, \sigma C_X^{\wedge}(-1/2) \, \mu C_X^N, \tag{10}$$

$$\sigma M_{X,y} = \sigma C_X^N \sigma C_X^{\wedge}(-1) \, \sigma d_{X,y}. \tag{11}$$

Because the most influential factor in a speech recognition performance is the mean vector $\mu M_{X,y}$ of the distribution, the mean vector $\mu M_{X,y}$ and the covariance matrix $\sigma M_{X,y}$ of the composite acoustic model $M_{X,y}$ are determined by the expression (8), (9) respectively, each of which does not include the change in the covariance matrix of the representative acoustic model due to noise-adaptation. In the present embodiment, the mean vector $\mu M_{X,y}$ and the covariance matrix $\sigma M_{X,y}$ of the set of composite acoustic models $M_{X,y}$ are calculated by the above expressions (8), (9), thereby reducing an amount of processing for calculation to acquire a noise adaptive performance.

The set of difference models $D_1$ ($d_{1,1} \sim d_{1,q1}$), $D_2$ ($d_{2,1} \sim d_{2,q2}$) . . . $D_X$ ($d_{X,1} \sim d_{X,qX}$) stored in the difference model storing unit 1b are renewed by renewal difference models which are generated using the renewal model generating section 5 and the model renewal section 6. The detailed descriptions will be given below.

As shown in FIG. 1, the difference model before renewal is denoted by D, and the difference model after renewal is denoted by D". The composite acoustic model being composed of the difference model D before renewal and the noise adaptive representative acoustic model $C^N$ is denoted by M, and that composed of the renewed difference model D" and the noise adaptive representative acoustic model $C^N$ is denoted by M".

The renewal model generating section 5 generates a noise and speaker adaptive acoustic model (noise and speaker adaptive acoustic HMM) R by speaker-adaptation of the composite acoustic model M to the feature vector series V(n) using such speaker adaptive methods as MLLR or MAP method.

The speaker-adaptation of the present embodiment makes use of the speaker utterance of text sentences or the like suitable for the speaker-adaptation.

Each feature vector series of every predetermined frame period having characteristics of the uttered speech output from the speech analyzing section 9, which analyzes the speech through the microphone 8 during the utterance period, is fed to the renewal model generating section 5 through changing over the switch 10 as shown by a dotted-line in FIG. 1. The composite acoustic model M generated in the composite acoustic model generating section 4 is also applied to the renewal model generating section 5 through the other dotted-line route in FIG. 1. Then, the renewal model generating section 5 generates a noise and speaker adaptive acoustic model R by the speaker-adaptation of the composite acoustic model M to the feature vector series V(n).

Figure 5:
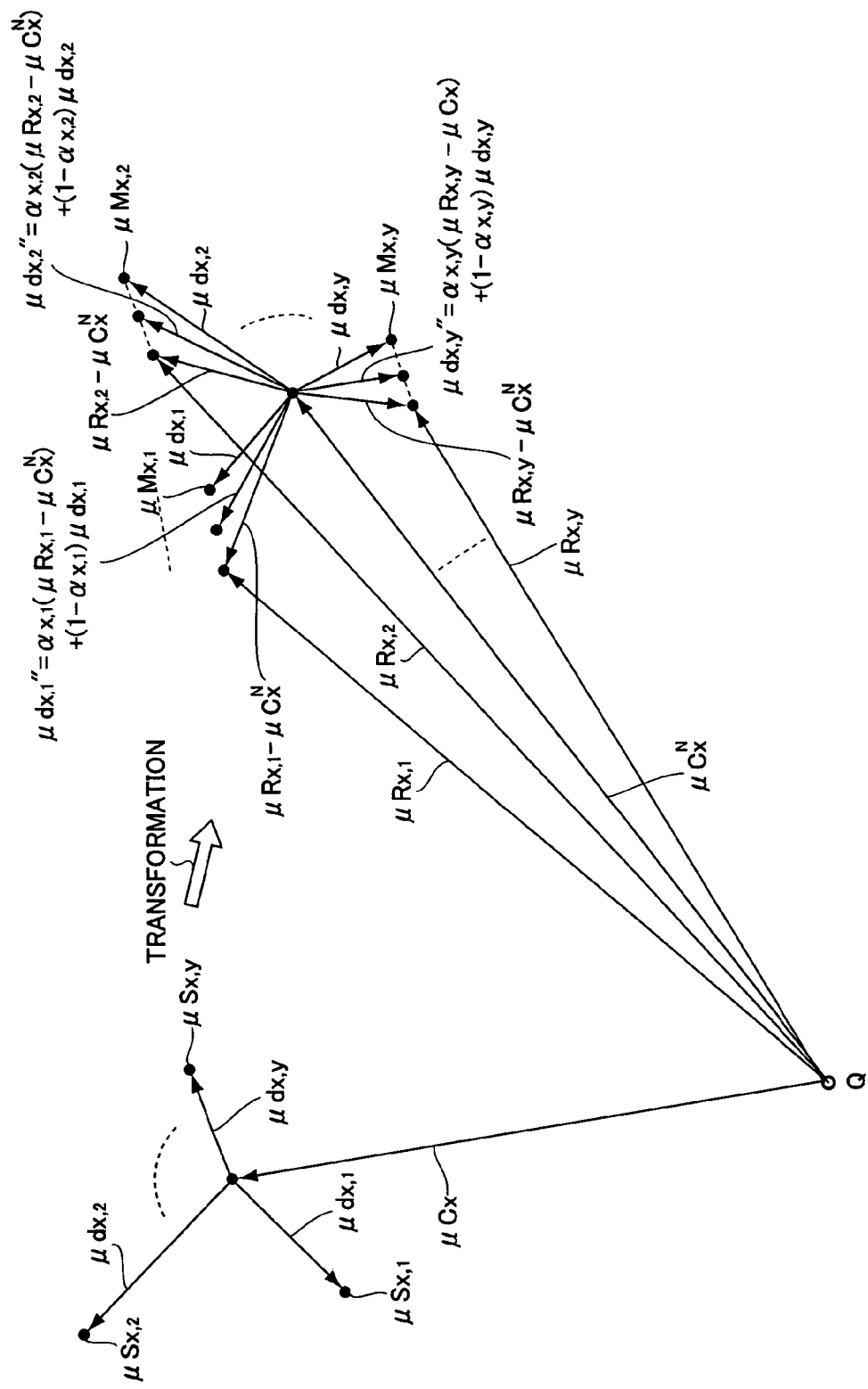
FIG. 5 is an explanatory view for illustrating a generation principle of noise and speaker adaptive acoustic models for adapting to both noise and speaker, and a generation principle of a renewal difference model.

FIG. 5 is a schematic drawing for illustrating a generation principle of the noise and speaker adaptive acoustic model R adapted to both noise and speaker. As a typical example, the generation of the noise and speaker adaptive acoustic model $R_{X,1} \sim R_{X,y}$ from the composite acoustic model $M_{X,1} \sim M_{X,y}$, which is composed of the representative acoustic model $C_X$ of group $G_X$ and the difference model $D_X$ ($d_{X,1} \sim d_{X,y}$) on the basis of the equations (8) and (9), is illustrated. The covariance matrix is not illustrated for simple explanations.

The noise and speaker adaptive acoustic model $R_{X,1}$ having a distribution with a mean vector $\mu R_{X,1}$ and a covariance matrix $\sigma R_{X,1}$ (omitted in this figure) is generated by using the calculation of the expressions (8) and (9). In the same manner, the noise and speaker adaptive acoustic model $R_{X,y}$ having a distribution with a mean vector $\mu R_{X,y}$ and a covariance matrix $\sigma R_{X,y}$ (not shown) is generated.

Furthermore, the other of the noise and speaker adaptive acoustic models corresponding to the groups G1, G2 . . . are generated by using the expressions (8) and (9), and all the noise and speaker adaptive acoustic models R are supplied to the model renewal section 6.

The model renewal section 6 generates the renewal difference model D" adapted to speaker by using the noise and speaker adaptive acoustic model R generated at the renewal model generating section 5, the noise adaptive representative acoustic model $C^N$ generated at the noise adaptive representative acoustic model generating section 3 and the difference model D before renewal stored in the difference model storing unit 1b, to renew the difference model D before renewal with the renewal difference model D".

The generation principle of the renewal difference model $D_X$" determined by the noise and speaker adaptive acoustic model $R_X$ of the group $G_X$, the noise adaptive representative acoustic model $C_X^N$ and the difference model before renewal $D_X$ will be explained. Each mean vector $\mu d_{X,1}" \sim \mu d_{X,y}"$ and the covariance matrices $\sigma d_{X,1}" \sim \sigma d_{X,y}"$ of the renewal difference model $D_X"$ ($d_{X,1}" \sim d_{X,y}"$) can be determined by the following expressions;

$$\mu d_{X,y}" = \alpha_{X,y} \cdot (\mu R_{X,y} - \sigma C_X^{N}(\tfrac{1}{2}) \; \sigma C_X^{\hat{}}(-\tfrac{1}{2}) \; \mu C_X^N) + (1 - \alpha_{X,y}) \; \mu d_{X,y} \quad (12)$$

$$\sigma d_{X,y}" = \alpha_{X,y} \cdot (\sigma C_X^N \cdot \sigma C_X^{\hat{}}(-1) \; \sigma R_{X,y}) + (1 - \alpha_{X,y}) \; \sigma d_{X,y}. \quad (13)$$

The above expressions (12), (13) show the method for noise-adaptation of the covariance matrices. When the noise-adaptation of the covariance matrices is not performed, the mean vector and the covariance matrices can be determined by the following expressions;

$$\mu d_{X,y}" = \alpha_{X,y} \cdot (\mu R_{X,y} - \mu C_X^N) + (1 - \alpha_{X,y}) \; \mu d_{X,y}, \quad (14)$$

$$\sigma d_{X,y}" = \alpha_{X,y} \cdot \sigma R_{X,y} + (1 - \alpha_{X,y}) \; \sigma d_{X,y}. \quad (15)$$

Furthermore, when the speaker-adaptation of the covariance matrices is not also performed, the mean vector and the covariance matrices can be determined by the following expressions;

$$\mu d_{X,y}" = \alpha_{X,y} \cdot (\mu R_{X,y} - \mu C_X^N) + (1 - \alpha_{X,y}) \; \mu d_{X,y}, \quad (16)$$

$$\sigma d_{X,y}" = \sigma d_{X,y}. \quad (17)$$

In the case of the speaker-adaptation, the adaptation effect upon the mean vector is large, but the adaptation effect upon the covariance matrix is small. This enables the use of the above expression (16), (17), which are applicable to the case of not performing the speaker-adaptation of the covariance matrix, for determining each mean vector $\mu d_{X,1}" \sim \mu d_{X,y}"$ and covariance matrices $\sigma d_{X,1}" \sim \sigma d_{X,y}"$ of the renewal difference model $d_{X,1}" \sim d_{X,y}"$, thereby reducing amounts of operation and acquiring the effect of the speaker-adaptation. Thus, the present embodiment determines the renewal difference model $d_{X,1}" \sim d_{X,y}"$ based on the above expressions (16), (17).

In addition, the coefficient $\alpha_{X,y}$ in the expressions (16), (17) is a weighted coefficient for adjusting the renewal difference model $d_{X,y}$ obtained from the noise and speaker adaptive acoustic model $R_{X,y}$ and the composite acoustic model $M_{X,y}$, and its range is $0.0 \leq \alpha_{X,y} \leq 1.0$.

The weighted coefficient $\alpha_{X,y}$ may be a predetermined value in the above-mentioned range, or may be changed every adaptation process like the weighted coefficient of MAP estimation method.

The renewal difference model $d_{X,1}"$ of the group $G_X$ is obtained as a distribution with the mean vector $\mu d_{X,1}"$, which is determined by vector sum of the vector $\alpha_{X,y} \cdot (\mu R_{X,y} - \mu C_X^N)$ of the first term in the right side of the expression (16) and the vector $(1 - \alpha_{X,y}) \mu d_{X,y}$ of the second term, and the covariance matrix $\sigma d_{X,1}$ determined by the expression (17), as shown in FIG. 5. The other renewal difference models can be also determined in the same manner.

The model renewal section 6 determines the renewal difference models $D_1" \sim D_X"$ corresponding to each group $G_1 \sim G_X$, to renew the difference models $D_1 \sim D_X$ before renewal by the renewal difference models $D_1" \sim D_X"$.

After the renewal of the difference model storing unit 1b by the renewal difference model D", the recognition processing section 7 recognizes uttered speech of a speaker from the beginning of real speech recognition.

When speech is not yet uttered after the beginning of speech recognition processing, the composite acoustic model generating section 4 generates the composite acoustic model M" adapted to both noise and speaker corresponding to all the groups $G_1 \sim G_X$ by the composition of the noise adaptive representative acoustic model $C^N$ generated in the noise adaptive representative acoustic model generating section 3 and the renewal difference model D".

Next, during the period of speech utterance, the speech analyzing section 9 generates the feature vector series V(n) of uttered speech involving the background noise, to supply the feature vector series V(n) to the recognition processing section 7 through changing over the switch 10.

The recognition processing section 7 compares the feature vector series V(n) with the word or sentence model series generated from the composite acoustic model M", to output the model of the composite acoustic model M" with the maximum likelihood as a recognition result.

The behaviors of the speech recognition apparatus will be explained below referring to the flow charts in FIG. 6 and FIG. 7.

Figure 6:
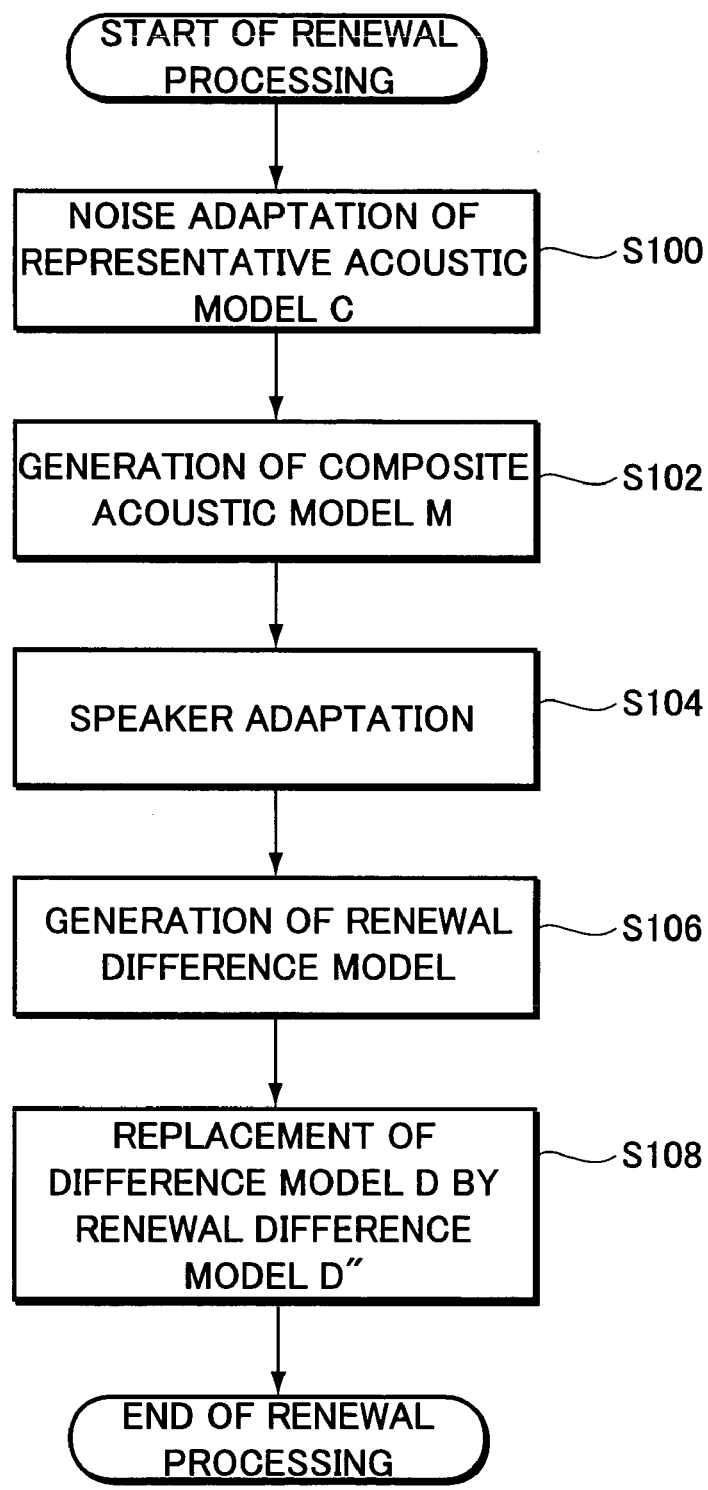
FIG. 6 is a flowchart for illustrating steps before a difference model is renewed by a renewal difference model.
Figure 7:
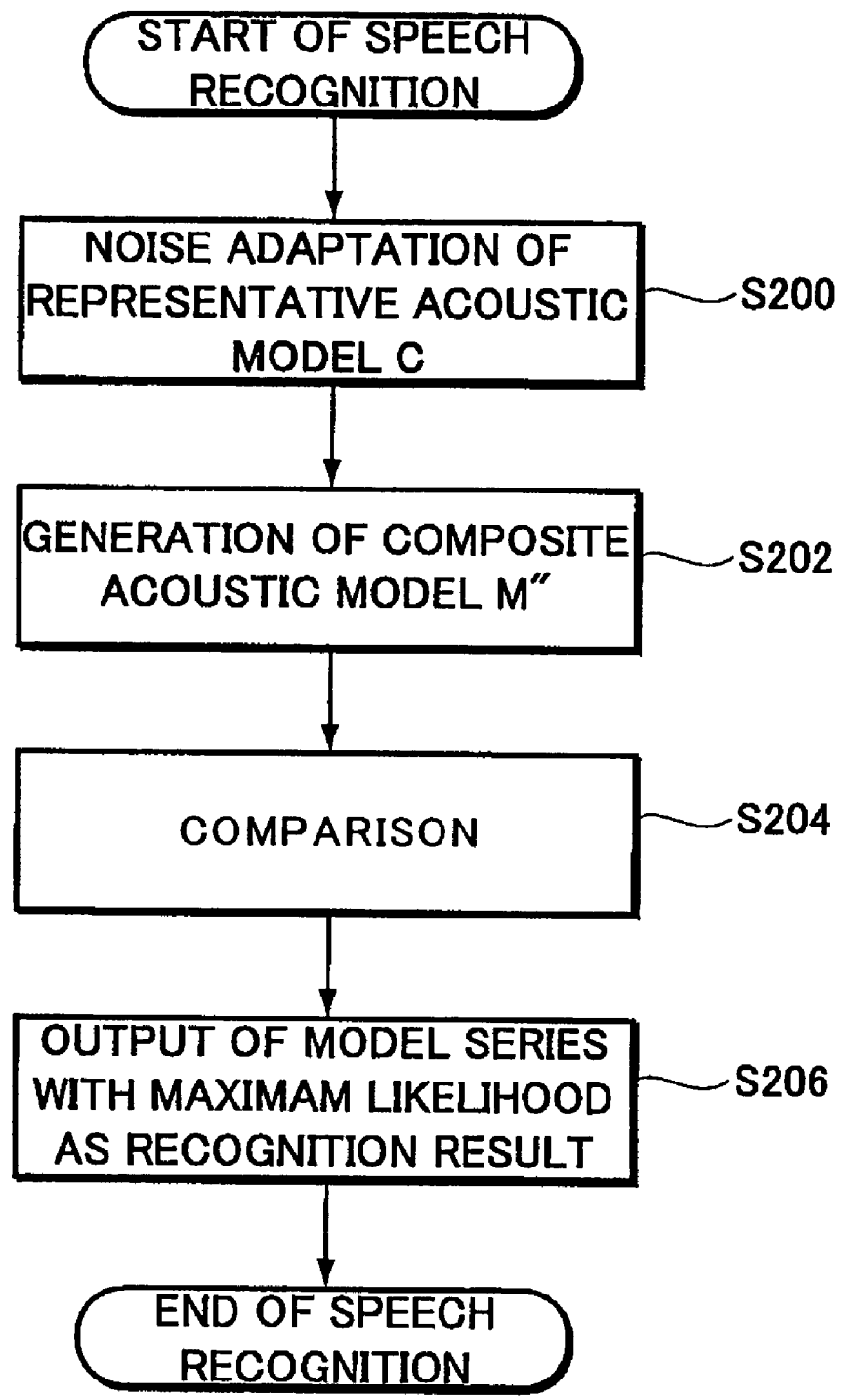
FIG. 7 is a flowchart for illustrating a behavior in speech recognition.

FIG. 6 shows the behavior for renewing the difference model D by the renewal difference model D", which is performed before the steps of recognizing speech. FIG. 7 shows the behavior for recognizing speech using the renewal difference model D".

As shown in FIG. 6, when the renewal processing begins, firstly at the step S100, the noise adaptive representative acoustic model generating section 3 generates the noise adaptive representative acoustic model $C^N$ by the adaptation of the representative acoustic model C to noise.

More specifically, the speech analyzing section 9 supplies the feature vector series N(n)' of the background noise during a non-utterance period to the uttered environment noise model generating section 2, wherein the uttered environment noise models N are generated by learning the feature vector series N(n)'.

Then, the noise adaptive representative acoustic model generating section 3 generates the noise adaptive representative acoustic model $C^N$ by using the noise-adaptation of the representative acoustic model C to the uttered environment noise model N.

At the next step S102, the composite acoustic model generating section 4 generates the composite acoustic model M by the composition of the noise adaptive representative acoustic model $C^N$ and the difference model d before renewal.

Thus, at the step S102, the composite acoustic model M is adapted only to noise, and is not yet adapted to speaker.

At the step S104, the renewal model generating section 5 executes the adaptation of the composite acoustic model M to the uttered speech of a speaker.

That is, while a speaker utters text sentences or the like, the speech analyzing section 9 supplies the feature vector series V(n) of the uttered speech to the renewal model generating section 5 through changing over the switch 10. Then, the renewal model generating section 5 generates the noise and speaker adaptive acoustic model R by the speaker-adaptation of the composite acoustic model M to the feature vector series V(n).

Thus, the noise and speaker adaptive acoustic model R adapted to both noise and speaker is generated at the step S104 as shown in FIG. 5.

At the next step S106, the model renewal section 6 generates the renewal difference model D" adapted to noise and speaker by using the noise and speaker adaptive acoustic model R, the noise adaptive representative acoustic model $C^N$ and the difference model D before renewal.

At the next step S108, the model renewal section 6 renews the difference model D (before renewal) in the difference model storing unit 1b with the renewal difference model D", so that the renewal processing is finished.

As mentioned above, the embodiment of the present invention does not employ the individual noise and speaker adaptation of the initial acoustic model, but applies the noise-adaptation of only the representative acoustic model C to generate the noise adaptive representative acoustic model $C^N$. Then, the composite acoustic models M generated by the composition of the noise adaptive representative acoustic models $C^N$ and the difference models D, are employed in the speaker-adaptation, so that the amounts of processing for adapting to noise and speaker can be remarkably reduced.

In the renewal processing, the renewal difference model D" having been adapted to noise and speaker is generated to be stored in the difference model storing unit 1b as a replacement of the old difference model. This causes also remarkable reduction of amounts of processing in speech recognition as described below, so that rapid speech recognition becomes possible.

Next, the behavior for recognizing speech will be explained referring to FIG. 7.

In the speech recognition apparatus, the processing of speech recognition starts when receiving a command of a speaker. At the step S200 in FIG. 7, the noise adaptive representative acoustic model generating section 3 generates the noise adaptive representative acoustic model $C^N$ by the noise-adaptation of the representative acoustic model C.

More specifically, during non-utterance period (in which the speaker yet utters nothing), the uttered environment noise model generating section 2 generates the uttered environment noise model N by learning the feature vector series N(n)' of the background noise from the speech analyzing section 9. Then, the noise adaptive representative acoustic model generating section 3 generates the noise adaptive representative acoustic model $C^N$ by noise-adaptation of the representative acoustic model C to the uttered environment noise model N.

At the step S202, the composite acoustic model generating section 4 generates the composite acoustic model M" adapted to noise and speaker by the composition of the noise adaptive representative acoustic model $C^N$ and the renewal difference model D".

Then, at the step S204, the recognition processing section 7 compares the feature vector series V(n) of the uttered speech with the word or sentence model generated from the composite acoustic model M", to recognize the uttered speech.

That is, when the speaker begins to utter any speech, the switch 10 is connected to the recognition processing section 7, and the feature vector series V(n) of the uttered speech involving the background noise, which is output from the speech analyzing section 9, is supplied to the recognition processing section 7. Then, the recognition processing section 7 compares the feature vector series V(n) with the word or sentence model series generated from the composite acoustic model M". Next, the model of the composite acoustic model M" with the maximum likelihood, which corresponds to the word or sentence, is output as a speech recognition result at the step S206.

As mentioned above, the embodiment of the present invention does not employ the individual noise and speaker adaptation of so called the initial acoustic models, but generates the composite acoustic models M" adapted to noise and speaker by the composition of the noise adaptive representative acoustic models $C^N$ and the renewal difference models D". As a result, the amounts of processing for adapting to noise and speaker can be extremely reduced.

In a conventional speech recognition, a speaker-adaptation accompanies an adaptation to the uttered speech environment noise, and thus an acoustic model to be adapted only to speaker necessarily involves the effect of adapting to environmental noise. That is, an acoustic model including both the speaker-adaptation and the noise-adaptation in full is compared with a feature vector series V(n) of uttered speech. As a result, an improvement of a speech recognition rate is hindered.

In the present embodiment, however, the acoustic model adapted to speaker generates the renewal difference model D". Since the composite acoustic model M" to be compared with is generated from the renewal difference model D", the effect of the noise-adaptation can be decreased. Thus, the synergistic effect of the noise and speaker adaptation can be acquired to achieve a higher speech recognition rate.

Second Embodiment

Figure 8:
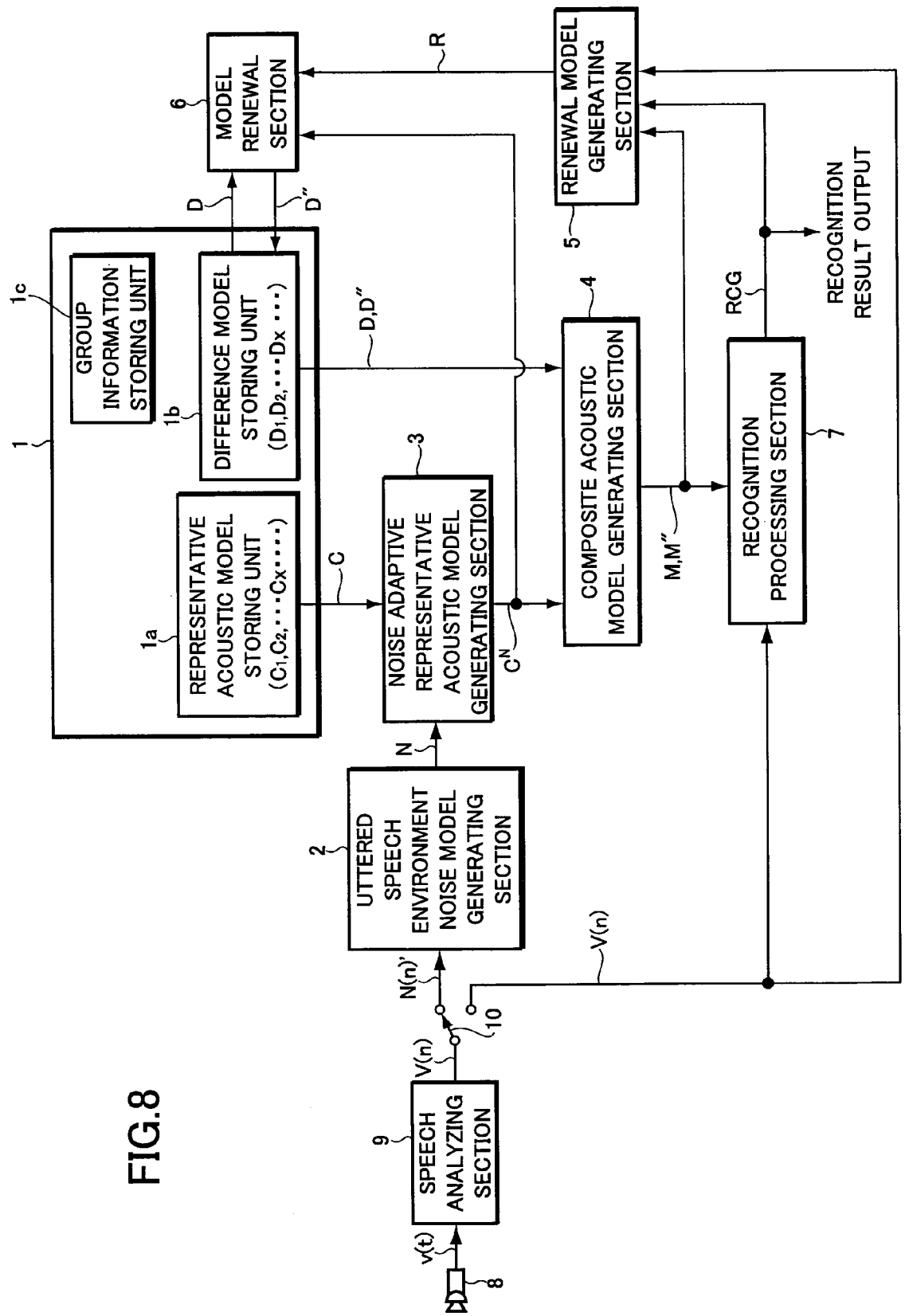
FIG. 8 is a block diagram for illustrating a structure of speech recognition apparatus according to the second embodiment of the present invention.

The second embodiment of the present invention will be explained, hereinafter, referring to FIG. 8 and FIG. 9. FIG. 8 is a drawing for illustrating the structure of the speech recognition apparatus of the present embodiment. FIG. 8 has the same reference numerals and codes as those of FIG. 1 with regard to members having the same function.

The difference between the speech recognition apparatus of the second embodiment and that of the first embodiment is as follows. In the speech recognition apparatus of the first embodiment, the speech recognition is performed after the generation of the renewal difference model D" adapted to noise and speaker as explained referring to the flowcharts in FIG. 6 and FIG. 7. On the other hand, the speech recognition apparatus of the present embodiment executes the speech recognition and the generation of the renewal difference model D", simultaneously, by the renewal processing of the renewal model generating section 5 and the model renewal section 6.

The behavior of the speech recognition apparatus will be explained with reference to the flowchart of FIG. 9.

Figure 9:
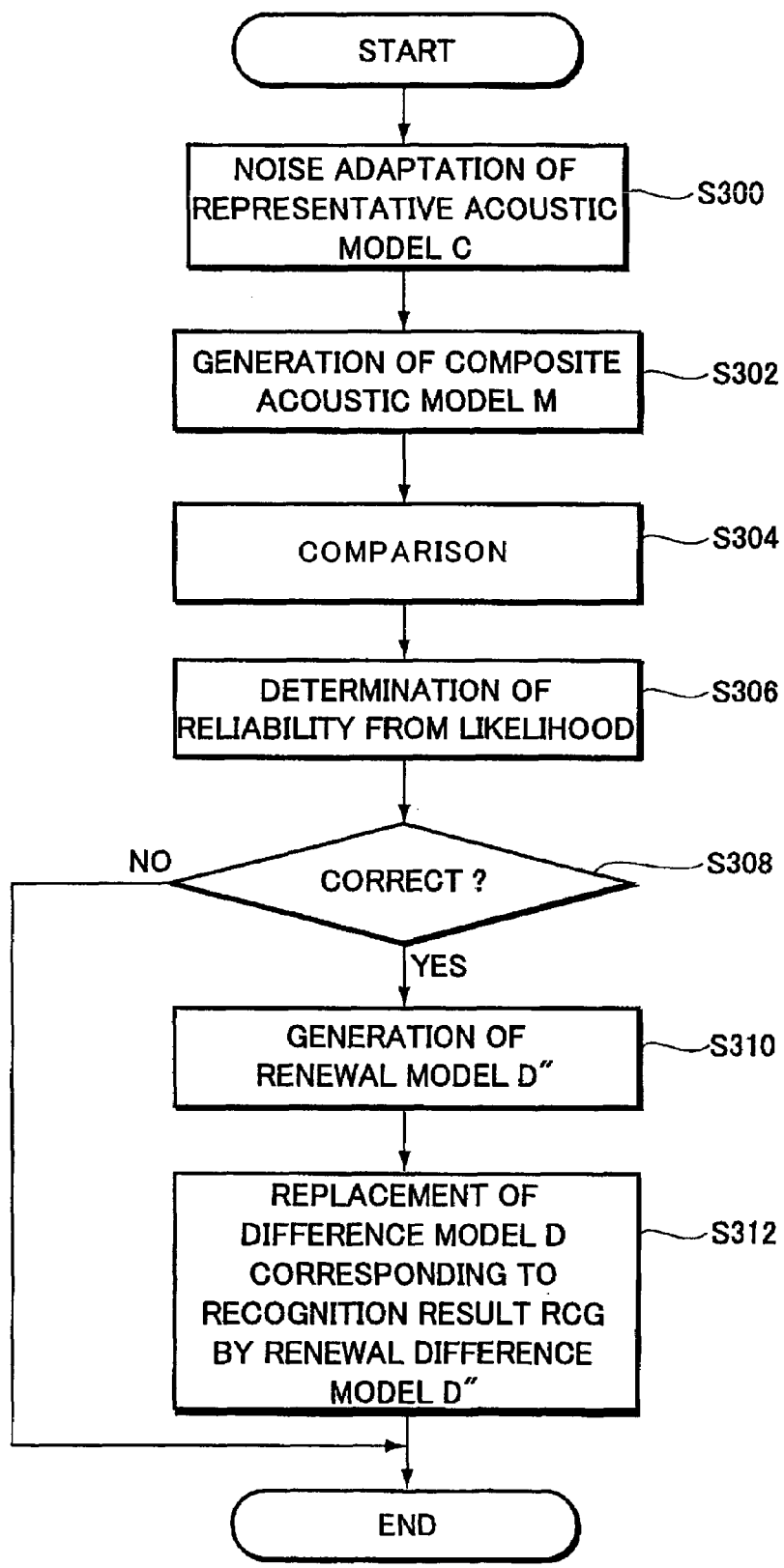
FIG. 9 is a flowchart for illustrating a behavior of speech recognition apparatus according to the second embodiment of the present invention.

As shown in FIG. 9, when the speech recognition processing begins, first at the step S300, the noise adaptive representative acoustic model generating section 3 generates the noise adaptive representative acoustic model $C^N$ by the adaptation of the representative acoustic model C to noise.

That is, the speech analyzing section 9 supplies the feature vector series N(n)' of the background noise during a non-utterance period to the uttered environment noise generating section 2, wherein the uttered environment noise models N is generated by learning the feature vector series N(n)'.

Then, the noise adaptive representative acoustic model generating section 3 generates the noise adaptive representative acoustic model $C^N$ by using the noise-adaptation of the representative acoustic model C to the uttered environment noise model N.

At the next step S302, the composite acoustic model generating section 4 generates the composite acoustic model M by the composition of the noise adaptive representative acoustic model $C^N$ and the difference model D before renewal.

Then, at the step S304, the recognition processing section 7 compares the feature vector series V(n) of the uttered speech with the word or sentence model generated from the composite acoustic model M, to recognize the uttered speech.

That is, when a speaker begins to utter any speech, the switch 10 is connected to the recognition processing section 7, and the feature vector series V(n) of the uttered speech generated in the speech analyzing section 9 is supplied to the recognition processing section 7. The recognition processing section 7 compares the feature vector series V(n) with the model series such as word or sentence generated from the composite acoustic model M, to output the model of the composite acoustic model M with the maximum likelihood as a speech recognition result RCG.

At the step S306, the likelihood values of the upper rank candidates as the recognition result are also output, thereby determining the reliability of the recognition result by comparing them with a predetermined standard.

At the next step S308, whether the recognition result is correct or incorrect is determined. If correct, the processing step goes to the step S310, and if not, the processing step jumps to the end. Methods for determining the reliability of recognition result have been developed diversely, but its explanation is omitted here.

At the step S310 and S312, the renewal model generating section 5 performs the the speaker-adaptation using the composite acoustic model M, the feature vector series V(n) of uttered speech, and the recognition result RCG. Then, the model renewal section 6 generates the renewal difference model D", and renews the difference model D before renewal.

That is, at the step S310, the renewal model generating section 5 determines the recognized model series using the recognition results RCG, to perform the speaker-adaptation of the composite acoustic model M using the feature vector series V(n).

For example, when a speaker utters "Tokyo" and the recognition result of the word "Tokyo" is output from the recognition processing section 7, the renewal model generating section 5 performs the speaker-adaptation of the composite acoustic model M of the word "Tokyo" using the feature vector series V(n) of the uttered word "Tokyo", so that the noise and speaker adaptive acoustic model R adapted to noise and speaker can be generated.

The model renewal section 6, furthermore, generates the renewal difference model D" corresponding to the recognition result RCG using the noise and speaker adaptive acoustic model R, the noise adaptive representative acoustic model $C^N$ and the difference model D before renewal.

At the step S312, the model renewal section 6 replaces the difference model (before renewal) D corresponding to the recognition result RCG by the renewal difference model D".

When the recognition result RCG is the word "Tokyo" as mentioned above, the difference model D before renewal of the word "Tokyo" is renewed by the renewal difference model D".

The speech recognition apparatus of the present embodiment, as described above, performs the speech recognition using the representative acoustic model C and the difference model D stored beforehand in the representative acoustic model storing unit 1a and the difference model storing unit 1b, respectively, and can simultaneously generate the renewal difference model D" adapted to noise and speaker.

The difference model D before renewal is renewed gradually with more and more accuracy by the speaker adaptive renewal difference model, as the number of speech recognition increases. Thus, the composite acoustic model M generated at the step S302 in FIG. 9 becomes gradually the composite acoustic model with the adaptation to noise and speaker.

The excellent effect of the improvement in recognition rate is achieved with increase in the number of usage of this speech recognition apparatus, because the recognition processing section 7 performs the speech recognition comparing the composite acoustic model M" having the speaker-adaptation with the feature vector series V(n) from the uttered speech.

In the first and second embodiment of the present invention, the group information may be renewed whenever the difference model D is renewed by the renewal difference model D".

That is, in the first embodiment, after the completion of the processing at the step S108 in FIG. 6, both the group information and the renewal difference model may be renewed in order to make the acoustic model belong to the group to which the most similar representative acoustic model belongs, based on the similarity between the composite model S", which is composed of the representative acoustic model C and the renewal difference model D", and the representative acoustic model C.

The renewal difference model $d_{x,y}$" is stored in the form of $d^m_{i,j,k}$" for the HMM number i, the state number j and the mixture number k, as mentioned previously.

The cluster to which the $d^m_{i,j,k}$" belongs is stored as the cluster information $B^m_{i,j,k}$, as previously mentioned. For example, assume that the cluster to which the $d^m_{i,j,k}$" belongs is β, that is, $B^m_{i,j,k}=\beta$, then, the representative acoustic model of the cluster to which the $d^m_{i,j,k}$" belongs is $C_\beta$. Therefore, the composite model $S^m_{i,j,k}$" is obtained from the composition of $d^m_{i,j,k}$" and $C_\beta$.

Assume that the most similar representative acoustic model is not $C_\beta$, but $C_\gamma$, as the result of the comparison based on the similarity between $S^m_{i,j,k}"$ and all the representative acoustic models. In this case, the renewal difference model is replaced by $d^m_{i,j,k}"=S^m_{i,j,k}"-C_\gamma$.

The cluster information is also replaced by $B^m_{i,j,k}=\gamma$.

The renewed difference information and group information is stored in the storing unit 1c.

By the grouping or clustering for the composite model S", the group information B, the representative acoustic model C, and the renewal difference model D" can also be renewed. However, the clustering operation needs enormous calculations and is not effective.

In the case of the employment of Jacobian adaptation as a noise adaptive method, the renewal of the representative acoustic model C needs more enormous calculations for forming the initial composite models.

It is effective to renew only the difference model and the group information in order to obtain the above-mentioned effect by small amount of calculation.

In the second embodiment, after the completion of the processing at the step S310 in FIG. 9, both the group information and the renewal difference model may be renewed in order to make the acoustic model belong to the group to which the most similar representative acoustic model belongs, on the basis of the similarity between the composite model S", which is composed of the representative acoustic model C and the renewal difference model D", and the representative acoustic model C.

The renewal difference model $d_{x,v}"$ is stored in the form of $d^m_{i,j,k}"$ for the HMM number i, the state number j and the mixture number k, as mentioned previously.

The cluster to which the $d^m_{i,j,k}"$ belongs is stored as the cluster information $B^m_{i,j,k}$, as previously mentioned. For example, assume that the cluster to which the $d^m_{i,j,k}"$ belongs is β, that is, $B^m_{i,j,k}=\beta$, then, the representative acoustic model of the cluster to which the $d^m_{i,j,k}"$ belongs is $C_\beta$. Therefore, the composite model $S^m_{i,j,k}"$ is obtained from composition of $d^m_{i,j,k}"$ and $C_\beta$.

Assume that the most similar representative acoustic model is not $C_\beta$, but $C_\gamma$, as the result of comparison based on the similarity between $S^m_{i,j,k}"$ and all the representative acoustic models. In this case, the renewal difference model is replaced by $d^m_{i,j,k}"=S^m_{i,j,k}"-C_\gamma$.

The cluster information is also replaced by $B^m_{i,j,k}=\gamma$.

The renewed difference information and group information is stored in the storing unit 1c.

By the grouping or clustering for the composite model S", the group information B, the representative acoustic model C and the renewal difference model D" can also be renewed. However, the clustering operation needs enormous calculations and is not effective.

In the case of the employment of Jacobian adaptation as a noise adaptive method, the renewal of the representative acoustic model C needs more enormous calculations for forming the initial composite models.

It is effective to renew only the difference model and the group information in order to obtain the above-mentioned effect by small amount of calculation.

As mentioned above, the first and second embodiments enable the speech recognition rate to be improved, an addition to the reduction of amount of processing for recognition.

In other words, the speech recognition apparatus and the speech recognition method of the first embodiment generate the renewal difference models to store in the storing unit 1 before performing the speech recognition using the renewal difference model. That is, a large number of acoustic models is divided into groups or clusters on the basis of the similarity, to obtain the group information, the representative acoustic model, and difference model every group or cluster. These models or information are stored every the identical group in the storing section 1.

Before the processing of real speech recognition, the renewal difference models, in which the adaptation to noise and speaker is executed, are generated, to renew the difference models already stored in the storing section 1.

When replacing the difference model in the storing section 1 by the renewal difference model, first, the noise adaptive representative acoustic model every identical group is generated by executing the noise-adaptation to the representative acoustic models every identical group stored in the storing section 1.

Next, each of the composite acoustic models adapted to noise is generated by the composition of each noise adaptive representative acoustic model and each difference model of the identical group.

Furthermore, the noise and speaker adaptive acoustic model is generated by the speaker-adaptation of the noise adaptive composite acoustic model to the feature vector series from the uttered speech.

Then, the difference model stored in the storing section 1 is replaced by the renewal difference model, which is generated from the difference between the noise and speaker adaptive acoustic model and the noise adaptive representative acoustic model.

when performing the speech recognition in the first embodiment, during non-utterance period, first, adaptation of the representative acoustic model to environmental noise generates the noise adaptive representative acoustic model. Then, the composite acoustic model adapted to noise and speaker is generated by the composition of the noise adaptive representative acoustic model and the renewed renewal difference model. Lastly, the speech recognition is performed by comparing the composite acoustic model adapted to noise and speaker with the feature vector series extracted from the uttered.

As mentioned above, the present embodiment employs the representative acoustic model and the difference model, and the renewal difference model, which is generated by adapting the difference model to noise and speaker. Then, the composite acoustic model needed for the comparison with the feature vector series obtained from the uttered speech in the speech recognition operation is generated by the composition of the noise adaptive representative acoustic model and the renewal difference model. This enables the generation of the composite acoustic model to be performed with smaller amounts of processing.

More specifically, the processing of noise and speaker adaptation is not performed for all of a large number of acoustic models needed for the speech recognition, but for only representative acoustic model of each group and the difference model thereof. The composite acoustic model to be matched with the feature vector series extracted from uttered speech can be generated by composition of the representative acoustic model and difference model, accompanying the noise and speaker adaptation, thereby realizing enormous decrease in quantity of processing.

The first embodiment may be modified as follows. After the generation of the noise and speaker adaptive model, the group to which the noise and speaker adaptive model belongs may be changed based on the similarity to the noise adaptive representative acoustic model. The group information may be also renewed so as to correspond to the change of the group, and the renewal difference model be generated by the difference between the noise and speaker adaptive model and the noise adaptive representative acoustic model of the changed group. In this case, the speech recognition is performed by using the composite acoustic model generated by the composition of the renewed difference model and the noise adaptive representative acoustic model generated by the noise-adaptation of the representative acoustic model selected with the renewed group information. These renewals of both the group information and the difference model enable the speech recognition rate to be improved.

According to the speech recognition apparatus and method of the second embodiment, a large number of acoustic models is divided into groups or clusters on the basis of the similarity, to obtain the group information, the representative acoustic model, and difference model. These models are stored corresponding to the identical group in the storing section 1. The present embodiment generates the renewal difference model adapted to noise and speaker every speech recognition during the speech recognition processing, and replaces the difference model in the storing section 1 by the renewal difference model.

The speech recognition is performed by comparing the feature vector series from the uttered speech with the composite acoustic model which is generated by composition of the noise adaptive representative acoustic model and the renewal difference model improving the effect of speaker-adaptation by renewing the stored difference model with the renewal difference model every repetition of speech recognition.

When replacing the difference model in the storing section 1 by the renewal difference model, firstly, each of the noise adaptive representative acoustic models is generated by noise-adaptation of each of the representative acoustic models stored in the storing section 1.

Next, the composite acoustic model adapted to noise is generated by composition of the noise adaptive representative acoustic model and the difference model every group.

Furthermore, the noise and speaker adaptive acoustic model is generated by executing the speaker-adaptation to the noise adaptive composite acoustic model with the feature vector series from the uttered speech.

Then, the difference model in the storing section 1 is replaced by the renewal difference model, which is generated from the difference between the noise and speaker adaptive acoustic model and the noise adaptive representative acoustic model.

The old renewal difference model stored in the storing section 1 is replaced by the newest renewal difference model every repetition of the speech recognition.

In the speech recognition, during non-utterance period, firstly, the adaptation of the representative acoustic model to environmental noise generates the noise adaptive representative acoustic model. Then, the composite acoustic model adapted to noise and speaker is generated by the composition of the noise adaptive representative acoustic model and the renewed renewal difference model. Lastly, the speech recognition is performed by comparing the composite acoustic model adapted to noise and speaker with the feature vector series extracted from the uttered speech to be recognized.

As mentioned above, the embodiment employs the representative acoustic model, the difference model, and the renewal difference model, which is generated by adapting the difference model to noise and speaker. Then, the composite acoustic model needed in the speech recognition is generated by the composition of the noise adaptive representative acoustic model and the renewal difference model as performed every speech recognition. Thus, this embodiment enables the composite acoustic model to be generated with smaller amounts of processing.

The second embodiment also may be modified as follows. After the generation of the noise and speaker adaptive model, the group to which the noise and speaker adaptive model belongs may be changed based on the similarity to the noise adaptive representative acoustic model. The group information may be also renewed so as to correspond to the change of the group, and the renewal difference model be generated by the difference between the noise and speaker adaptive model and the noise adaptive representative acoustic model of the changed group. In this case, the speech recognition is performed by using the composite acoustic model generated by the composition of the renewed difference model and the noise adaptive representative acoustic model generated by the noise-adaptation of the representative acoustic model selected with the renewed group information. These renewals of both the group information and the difference model enable the speech recognition rate to be improved.

According to the first and second embodiments, a remarkable reduction in an amount of processing for generating the composite acoustic model is obtained, as well as an improvement in processing speed and in the recognition rate, because the noise and speaker adaptive composite acoustic model to be compared with the feature vector series of the uttered speech, is generated by the composition of the noise adaptive representative acoustic model and the renewal difference model, in which the speaker-adaptation is executed to the difference model, using the noise adaptive representative model, the difference model and the uttered speech.

The present application claims priority from Japanese Patent Application No. 2002-271670, the disclosure of which is incorporated herein by reference.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A speech recognition apparatus for recognizing speech by comparing composite acoustic models adapted to noise and speaker with a feature vector series extracted from an uttered speech, comprising:

a storing section for previously storing each representative acoustic model selected as a representative of acoustic models belonging to one of groups, each of said groups being formed beforehand by classifying a large number of acoustic models on a basis of a similarity, difference models of each group obtained from difference between said acoustic models belonging to one of said groups and said representative acoustic model of said identical group, and group information for corresponding said representative acoustic models with said difference models every said identical group, a generating section for generating each noise adaptive representative acoustic model of said each group by noise-adaptation executed to said representative acoustic model of said each group stored in said storing section;

a generating section for generating each composite acoustic model of said each group by composition of said difference model and said noise adaptive representative acoustic model using said group information;

a renewal model generating section for generating noise and speaker adaptive acoustic models by performing a speaker-adaptation of said composite acoustic model every identical group, using the feature vector series obtained from the uttered speech; and a model renewal section for replacing said difference models of said each group by renewal difference models which are generated by taking differences between said noise and speaker adaptive acoustic models and said noise adaptive representative acoustic models selected via said group information;

wherein a speech recognition is performed by comparing the feature vector series extracted from the uttered speech to be recognized with said composite acoustic model adapted to noise and speaker, and wherein said composite acoustic model adapted to noise and speaker is generated by composition of said renewal difference model and said noise adaptive representative acoustic model, which is generated by a noise-adaptation of said representative acoustic model of said group including said renewal difference model selected via said group information.

2. A speech recognition apparatus for recognizing speech by comparing composite acoustic models adapted to noise and speaker with a feature vector series extracted from an uttered speech, comprising:

a storing section for previously storing each representative acoustic model selected as a representative of acoustic models belonging to one of groups, each of said groups being formed beforehand by classifying a large number of acoustic models on a basis of a similarity, difference models of each group obtained from difference between said acoustic models belonging to one of said groups and said representative acoustic model of said identical group, and group information for corresponding said representative acoustic models with said difference models every said identical group, a generating section for generating each noise adaptive representative acoustic model of said each group by noise-adaptation executed to said representative acoustic model of said each group stored in said storing section;

a generating section for generating each composite acoustic model of said each group by composition of said difference model and said noise adaptive representative acoustic model using said group information;

a recognition processing section for recognizing speech by comparing said composite acoustic models generated in said generating section for composite acoustic models with the feature vector series extracted from the uttered speech to be recognized;

a renewal model generating section for generating noise and speaker adaptive acoustic models by performing a speaker-adaptation of said composite acoustic model every identical group, using the feature vector series obtained from the uttered speech; and a model renewal section for replacing said difference models of said each group by renewal difference models which are generated by taking differences between said noise and speaker adaptive acoustic models and said noise adaptive representative acoustic models selected via said group information;

wherein said recognition processing section performs a speech recognition by comparing the feature vector series extracted from the uttered speech to be recognized with said composite acoustic model adapted to noise and speaker generated by composition of said noise adaptive representative acoustic model generated by noise-adaptation of said representative acoustic model of each group including said renewal difference model selected with said group information and said renewal difference model renewed by said renewal model generating section and said model renewal section, every repetition of the speech recognition.

3. The speech recognition apparatus according to claim 1 or 2, wherein said model renewal section repeats to change the group including said noise and speaker adaptive acoustic model of the group information based on a similarity of said noise and speaker adaptive acoustic model and said noise adaptive representative acoustic model, every generation of said renewal difference model, and said difference model stored in said storing section is renewed with the difference between said noise and speaker adaptive acoustic model and said noise adaptive representative acoustic model of the group including said noise and speaker adaptive acoustic model selected based on said renewed group information.

4. A speech recognition method for recognizing speech by comparing a set of composite acoustic models adapted to noise and speaker with a feature vector series extracted from an uttered speech, comprising the steps of:

previously storing, in a storing section, each representative acoustic model selected as a representative of acoustic models belonging to one of groups, each of said groups being formed beforehand by classing a large number of acoustic models on a basis of a similarity, difference models of each group obtained from difference between said acoustic models belonging to one of said groups and said representative acoustic model of said identical group, and group information for corresponding said representative acoustic models with said difference models every said identical group;

generating each noise adaptive representative acoustic model of said each group by noise-adaptation executed to said representative acoustic model of said each group stored in the storing section;

generating each composite acoustic model of said each group by composition of said difference model and said noise adaptive representative acoustic model using said group information;

generating noise and speaker adaptive acoustic models by performing a speaker-adaptation of said composite acoustic model every identical group, using the feature vector series obtained from the uttered speech; and replacing said stored difference models of said each group by renewal difference models which are generated by taking differences between said noise and speaker adaptive acoustic models and said noise adaptive representative acoustic models selected via said group information;

wherein said speech recognition is performed by comparing the feature vector series extracted from the uttered speech to be recognized with said composite acoustic model adapted to noise and speaker, and wherein said composite acoustic model adapted to noise and speaker is generated by composition of said renewal difference model and said noise adaptive representative acoustic model, which is generated by a noise-adaptation of said representative acoustic model of said group including said renewal difference model selected via said group information.

5. A speech recognition method for recognizing speech by comparing a set of composite acoustic models adapted to noise and speaker with a feature vector series extracted from an uttered speech, comprising the steps of:

previously storing, in a storing section, each representative acoustic model selected as a representative of acoustic models belonging to one of groups, each of said groups being formed beforehand by classing a large number of acoustic models on a basis of a similarity, difference models of each group obtained from difference between said acoustic models belonging to one of said groups and said representative acoustic model of said identical group, and group information for corresponding said representative acoustic models with said difference models every said identical group, generating each noise adaptive representative acoustic model of said each group by noise-adaptation executed to said representative acoustic model of said each group stored in the storing section;

generating each composite acoustic model of said each group by composition of said difference model and said noise adaptive representative acoustic model using said group information;

recognizing a speech by comparing said composite acoustic models generated in said generating step for composite acoustic models with the feature vector series extracted from the uttered speech to be recognized;

generating noise and speaker adaptive acoustic models by performing a speaker-adaptation of said composite acoustic model every identical group, using the feature vector series obtained from the uttered speech; and replacing said stored difference models of said each group by renewal difference models which are generated by taking differences between said noise and speaker adaptive acoustic models and said noise adaptive representative acoustic models selected via said group information;

wherein said recognition processing step performs a speech recognition by comparing the feature vector series extracted from the uttered speech to be recognized with said composite acoustic model adapted to noise and speaker generated by composition of said noise adaptive representative acoustic model generated by noise-adaptation of said representative acoustic model of each group including said renewal difference model selected with said group information and said renewal difference model renewed by said noise and speaker adaptive acoustic models generating step and said difference models replacing step, every repetition of the speech recognition.

6. The speech recognition method according to claim 4 or 5, wherein said difference models replacing step repeats to change the group including said noise and speaker adaptive acoustic model of the group information based on a similarity of said noise and speaker adaptive acoustic model and said noise adaptive representative acoustic model, every generation of said renewal difference model, and said difference model stored in said storing section is renewed with the difference between said noise and speaker adaptive acoustic model and said noise adaptive representative acoustic model of the group including said noise and speaker adaptive acoustic model selected based on said renewed group information.

* * * * *